S. S. ALLEN.
Corn Sheller.

No. 1,472.  Patented Jan'y 15, 1840.

UNITED STATES PATENT OFFICE.

SAMUEL S. ALLEN, OF MIAMISBURG, OHIO.

MACHINE FOR HUSKING AND SHELLING CORN.

Specification of Letters Patent No. 1,472, dated January 15, 1840.

*To all whom it may concern:*

Be it known that I, SAMUEL S. ALLEN, of Miamisburg, in the county of Montgomery and State of Ohio, have invented an Improvement in the Manner of Constructing Machines for Husking and Shelling Corn; and I do hereby declare that the following is a full and exact description thereof.

My machine consists, principally, of a vertical, conical nut, set with teeth, which is made to revolve within a case, or curb, which case, or curb, is composed, in part, of movable slats, or staves, which are hinged, or so hung at their upper ends, as to allow their lower ends to move in and out, said lower ends being borne up toward the conical nut by straight, spiral, or other, springs; said case, or curb, also consists, in part, of stationary pieces of wood, or metal, which are situated between the edges, or joinings, of the movable slats, or staves, in such manner as to allow said slats to play in and out without opening their joints so as to admit a grain of corn, or other matter, to insinuate itself between said joints, and, consequently, to interfere with the action of the machine.

Figure 1:
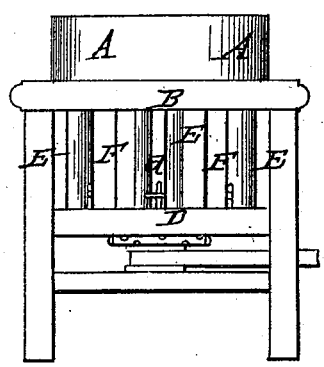

Figure 1, in the accompanying drawing is a side view of the machine, A, A, being a hopper into which the corn to be shelled is to be thrown. B, is a platform which constitutes the top of the case, or curb, and to which the movable staves may be hinged. D, D, is a second platform upon which the curb, &c, is sustained. E, is one of the movable staves, or slats, which is situated between the stationary pieces F, F; the spring *a*, serves to force the stave E, inward, so as to bear against the ears of corn. The stationary pieces F, F, are affixed by their ends to the platforms B, and D, and the staves E, may be hung by rods, or pins, passing through them, and into the pieces F, F.

Figure 2:
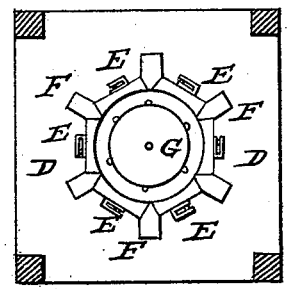

Fig. 2, is a horizontal section through the middle of the curve E, E, being the movable staves, and F, F, the stationary pieces. The edges of the staves are made square, or parallel to each other, and the stationary pieces F, F, are brought to an angle at their inner sides, as shown, in the drawing, so as to fill the space between the respective staves, allowing no more room than is necessary for freedom of motion. The inner sides of the staves are made concave to adapt them to the circle of the curb, and the inner, or angular, edges of the pieces F, F, are chamfered off, or made to retire, at their lower ends, so that they may not present obstructions to the ears of corn, as the staves spring out.

Figure 3:
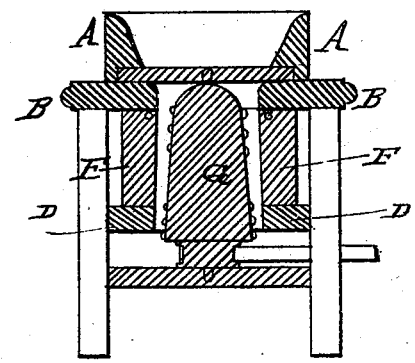

Fig. 3, is a vertical section through the machine, G, being the conical nut, which is to run in suitable bearings above and below, and may be driven by any adequate power. The conical nut is to be set with teeth arranged spirally; or it may consist of cast-iron pieces having teeth cast on them, and connected together in any of the ordinary modes.

In a machine driven by horse power, I have made the frame three feet square and four high; the platforms two feet apart, the opening through the upper one eighteen inches, and through the lower, twenty-one inches in diameter, the staves standing 1½ inch within this lower opening, so that the bottom of the curb, when the staves are sprung in, is eighteen inches in diameter, as it is at the top. The conical nut is eighteen inches long, eleven inches in diameter at its upper, and fifteen at its lower end. Its top is rounded, to allow of the ready admission of the ears of corn, and it has been found that these will readily arrange themselves in the proper position for being shelled, very few of the cobs being broken in passing through the machine. When the machine is to be used by hand, its dimensions must, necessarily, be lessened, so as to adapt it to the power to be employed.

I do not claim to be the first to have constructed a machine for shelling corn by the aid of a revolving conical nut, furnished with teeth, and placed within a curb, nor do I claim to be the first to have used spring staves to bear the corn up against the revolving nut; but What I do claim in the above described machine, is—

The manner in which I have arranged and combined the hinged staves, furnished with springs with the stationary pieces F, F, so as to allow the said staves to spring out without opening the joints between them; the whole being constructed substantially in the manner, and for the purpose, set forth.

I have denominated my machine, a machine for husking and shelling of corn, having found that both these operations may, if desired, be performed by it, simultaneously, without the slightest interference of one of them with the other.

SAMUEL S. ALLEN.

Witnesses:
   THOS. P. JONES,
   GEORGE WEST.